(12) United States Patent
Iden

(10) Patent No.: US 8,296,960 B1
(45) Date of Patent: Oct. 30, 2012

(54) COMPASS WITH IMPROVED READING PRECISION

(75) Inventor: Marlin Iden, Riverton, WY (US)

(73) Assignee: Fenix Outdoor AB, Ornskoldsvik (SE)

( * ) Notice: Subject to any disclaimer, the term of this patent is extended or adjusted under 35 U.S.C. 154(b) by 0 days.

(21) Appl. No.: 13/181,749

(22) Filed: Jul. 13, 2011

(51) Int. Cl.
*G01C 17/08* (2006.01)
(52) U.S. Cl. ............... 33/355 R; 116/328; 33/364
(58) Field of Classification Search ........... 33/355 R, 33/355 D, 356, 364; 116/327, 328
See application file for complete search history.

(56) References Cited

U.S. PATENT DOCUMENTS

| | | | | |
|---|---|---|---|---|
| 100,821 A * | 3/1870 | Tuttle | ............... | 33/356 |
| 2,687,577 A * | 8/1954 | Pallotti | ............... | 33/355 R |
| 3,919,782 A * | 11/1975 | Vaucher | ............... | 33/356 |
| 5,080,035 A * | 1/1992 | MacManus | ............... | 116/328 |
| 6,430,825 B1 * | 8/2002 | Baumann | ............... | 33/355 R |
| 7,134,213 B1 * | 11/2006 | Ashin | ............... | 33/355 R |
| 7,448,140 B2 * | 11/2008 | Nash | ............... | 33/355 R |
| 2003/0110651 A1 * | 6/2003 | Chang | ............... | 33/355 R |
| 2007/0006472 A1 * | 1/2007 | Bauch | ............... | 33/355 R |

* cited by examiner

*Primary Examiner* — G. Bradley Bennett
(74) *Attorney, Agent, or Firm* — Nixon & Vanderhye PC

(57) ABSTRACT

A recreational or outdoor compass is comprised of a base member and a vial assembly pivotally coupled to said base member. The vial assembly comprises a vial with an orienting marker and a magnetized indicator member journaled in the vial and pointing to magnetic north, the indicator member having through hole. The orienting marker has an outer contour, wherein the shape of the outer contour of the orienting marker essentially corresponds to the shape of the inner contour of the through hole, such that the outer contour of the orienting marker virtually matches the inner contour of the through hole when pointing northwards.

11 Claims, 3 Drawing Sheets

COMPASS WITH IMPROVED READING PRECISION

FIELD OF THE INVENTION

The present invention relates to an outdoor or recreational compass, more particularly to a hand-held compass for orienteering, direction-finding and locating positions on topographic maps.

BACKGROUND OF THE INVENTION

Compasses of various kinds are known in the state of the art and are used for orienteering, i.e. the practice of using a map and a compass to determine ones route of travel. Commonly, those compasses comprise a base member and a vial assembly pivotally coupled to the base member. The vial assembly comprises a vial and an azimuth ring as well as a magnetized indicator member pivotally journaled in the vial. Generally, the magnetized indicator member is a needle pointing to magnetic north. Moreover, an orienting marker is located in the vial. Commonly, the orienting marker is in form of an orienting arrow.

For taking a bearing for a destination visually, the compass is held level with a direction-of-travel arrow pointing towards the desired destination. As a next step, the azimuth ring is rotated until orienting arrow lines up with the needle, hence both pointing to magnetic north. The bearing can then be read from the degree markings of the azimuth ring lined up with the direction-to-travel arrow.

Similarly, when using the compass with a map or when using the compass to travel along a known bearing, the step of lining up the orienting arrow with the needle is mandatory. However, the reading of the bearing can be inaccurate due to parallax, i.e. the apparent displacement of the needle or the orienting arrow when viewed from different line of sights. Thus, even slight deviations between orienting arrow and the needle may mean that one gets lost or one needs to verify the bearing several times. This can easily happen under stressful or dangerous situations in the wilderness, as relatively large areas have to be brought into alignment.

The objective of the present invention is to provide a compass that allow for a more accurate bearing due to reduced parallax.

SUMMARY OF THE INVENTION

The present invention is directed to overcoming the problems set forth above by providing a compass with improved bearing precision with the features of claim 1. Preferred embodiments of the invention are disclosed in the dependent claims 2 to 11.

The inventive compass comprises a base member and a vial assembly pivotally coupled to said base member. The vial assembly comprises a vial with at least one orienting marker with an outer contour, an azimuth ring and a magnetized indicator member pivotally journaled in the vial. The magnetized indicator member points to magnetic north. The indicator member further comprises a through hole. The shape of the inner contour of the through hole essentially corresponds to the shape of the outer contour of the orienting marker. Hence, when the orienting marker and the indicator member are lined up, i.e. both pointing northwards, the outer contour of the orienting marker virtually matches the inner contour of the through hole.

Hence, the orienting marker is totally encircled by the through hole of the indicator member. Since this refers to a well delimited area of the indicator member, the user does not need to observe the whole indicator member and orienting marker. Thus, a displacement between the orienting marker and the indicator member leading to inaccuracies becomes more easily apparent. Accordingly, the inventive solution provides a compass that allows for a facilitated handling and a more accurate reading of the bearing.

The outer contour of the orienting marker and the inner contour of the through hole may be of a circular shape. However, other shapes like rectangular or triangular shapes are also possible.

According to another aspect of the invention, the circular shaped contours further comprise matching indentations. This ensures that that the indicator member and the orienting marker are perfectly lined up and hence further improves the readability of an accurate and non-parallax bearing.

According to another aspect of the invention, the indentations point northwards. Typically, the indentations have a triangular shape. Hence, one can easily line up the indicator member and the orienting marker. Moreover, for determining the northing, one solely needs to level the compass with the indentation of the indicator member pointing to magnetic north.

According to another aspect of the invention, the magnetized indicator member is a needle comprising a north end. Thus, the north end of the needle points to magnetic north and allows for a clear determination of the bearing.

According to another aspect of the invention, the needle comprises a south end. Accordingly, the compass may also be used for taking a south-oriented bearing.

According to another aspect of the invention, the through hole is positioned at one end of the needle. As the distance of the through hole is farthest from the pivot axis of the needle, the circular arc is maximal. Accordingly, a fine and non-parallax alignment of the needle and the orienting marker can be achieved. Furthermore, if the needle is provided with a north end and a south end, one cannot mistake the tips of the needle, when a through hole is provided on one of the ends.

According to another aspect of the invention, an "N" is placed within the contour of the orienting marker. This facilitates the handling of the compass, especially when used in remote locations during e.g. a stressful situation.

According to another aspect of the invention, the contour of the orienting marker is at least partially filled with a color silhouetted against the N. The orienting marker is clearly visible and stands out from the background.

According to another aspect of the invention, the vial may be transparent. This ensures that the compass can be used together with a map by placing the compass onto the map, still being able to identify the map's content, e.g. longitudinal lines.

According to another aspect of the invention, the vial is filled with a damping fluid. The fluid dampens the spinning action of the needle. Hence, shivering of the needle is avoided resulting in a quicker and more accurate readability of the bearing.

The foregoing is given more for the purpose of illustration and not limitation with respect to different features of the compass.

The above and other objects, advantages and features of the present invention will become more readily appreciated and understood from consideration of the following detailed description of a preferred embodiment of the present invention when taken together with the accompanying drawings.

BRIEF DESCRIPTION OF THE DRAWINGS

FIG. 1b is an enlarged detail of the compass shown in FIG. 1a.

DETAILED DESCRIPTION OF THE DRAWINGS

Figure 1A:
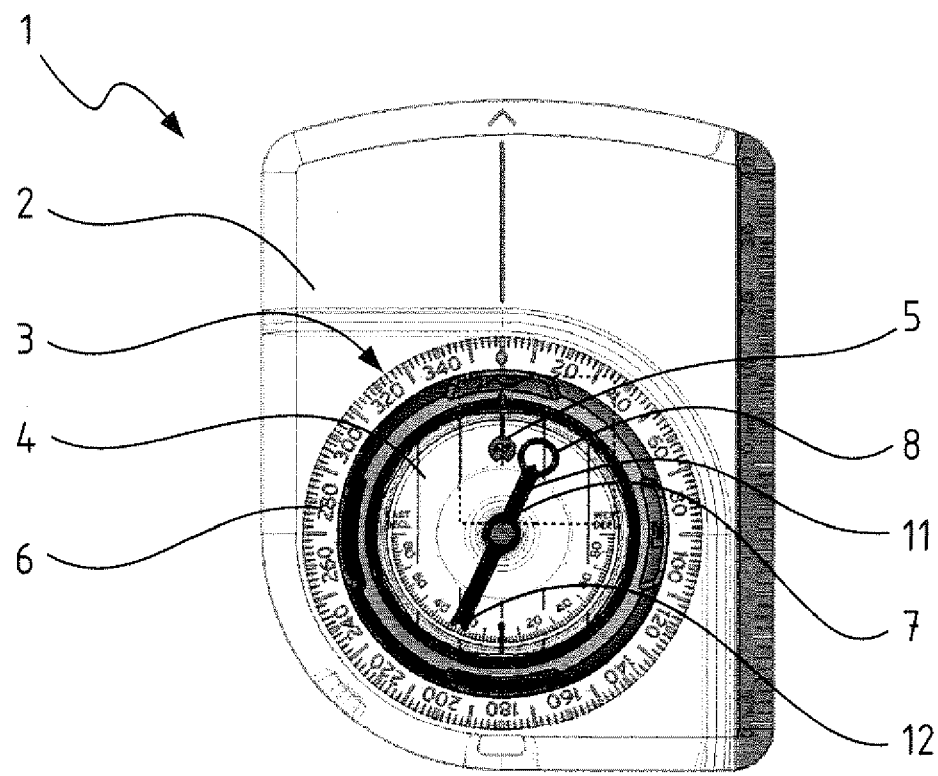
FIG. 1*a* is a top plan view of the preferred embodiment of the invention.
Figure 1B:
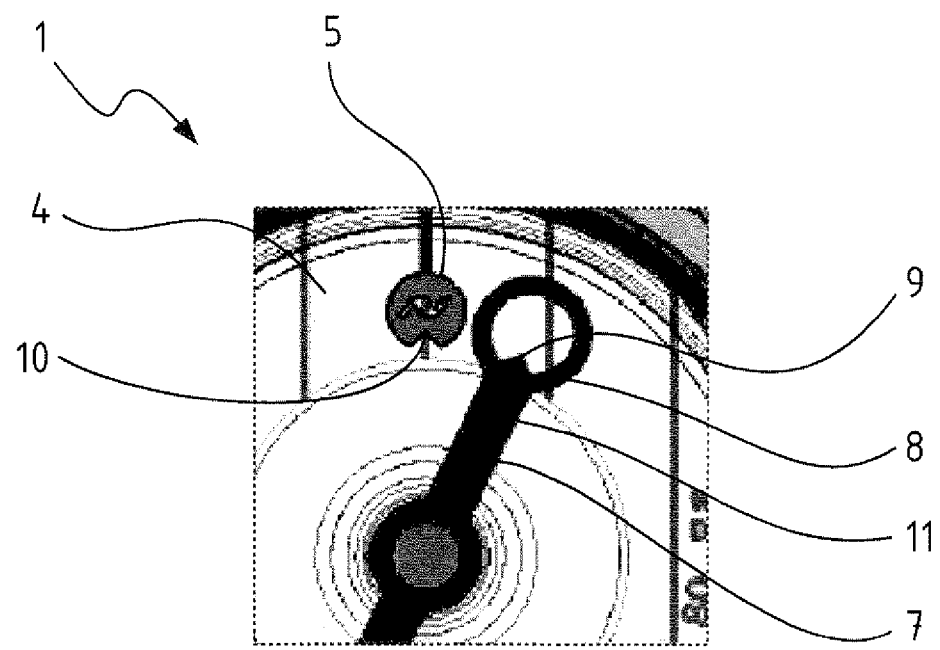

A compass 1 is illustrated in FIG. 1a and FIG. 1b and is broadly comprise of a base member 2 being transparent and made of a plastic material having a direction-of-travel arrow, and a vial assembly 3 pivotally mounted to the base member 2. The base member 2 has a ruler on one side.

The vial assembly 3 comprises a fluid filled transparent and sealed compass capsule or vial 4 having an orienting marker 5 on its bottom side. The orienting marker 5 can be engraved or printed, essentially having an outer contour of circular shape and a triangular shaped indentation 10 pointing to the center of the orienting marker 5. The outer contour of the orienting marker 5 surrounds the letter "N" to designate North. The orienting marker 5 is filled with a color, silhouetted against the letter "N", e.g. red, while the "N" can be colored in white or may left transparent.

A rotatable magnetized indicator member in 7 in form of a needle 7 is pivotally 110 journaled in the vial 4, with the pivot axle of the needle 7 being in the center of the vial 4. The needle 7 comprises a north end 11, a south end 12 and a through hole 8 positioned at the north end 11 of the needle 7. The through hole 8 has an inner contour of circular shape and an indentation 9 of triangular shape pointing northwards, essentially corresponding to the outer contour of the orienting marker 5. The movement of the needle 7 is dampened by the clear fluid filled in the vial 4.

The vial assembly 3 further comprise of an azimuth ring 6 surrounding the vial 4, the azimuth ring 6 having a degree scale in 2°-steps and a rubber casing with emphasized orientation information, depicted by the letters "N", "S", "E" and "W" aligned with the degree scale. A transparent disc is provided on the bottom of the vial assembly having longitudinal lines and a degree scale printed or engraved on it.

FIG. 1b is an enlarged detail of FIG. 1a as denoted by the dashed-lined box. As best seen in FIG. 1b, the needle 7 and the orienting marker 5 are not lined up. By either rotating the compass 1 or by rotating the vial assembly 4, the needle 7 and the orienting marker 5 can be lined up such that the outer contour of the orienting marker 5 and the inner contour of the through hole 8 of the needle 7 virtually match, as can be seen in FIG. 2.

Figure 2:
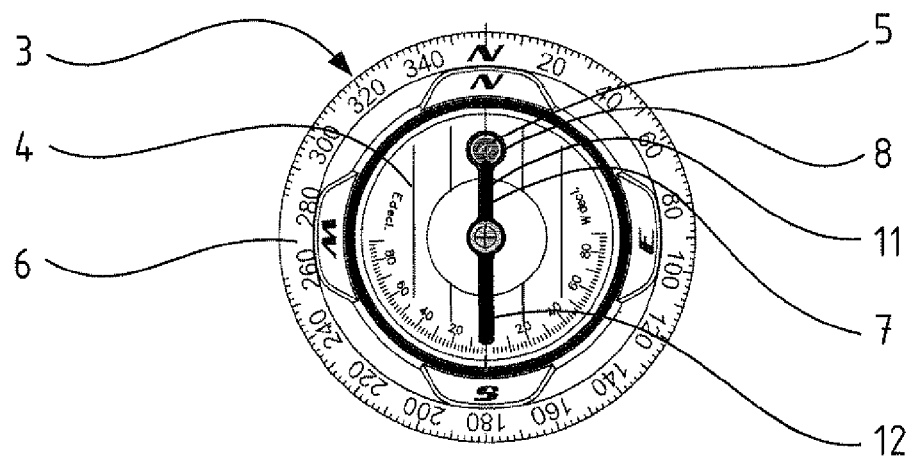
FIG. 2 is a top plan view of a vial assembly.

As can further be seen from FIG. 2, the inner contour of the through hole 8 is slightly larger the outer contour of the orienting marker 5. Hence, when the needle 7 and the orienting marker 5 both point to magnetic north, the orienting marker 5 is centered the through hole 8 of the needle 7 and a slight circle between the inner contour of the through hole 8 and the outer contour of the orienting marker 5 is visible. This helps to perfectly align the needle 7 and the orienting marker 5 such that a non-parallaxed reading of the bearing is possible.

While a preferred embodiment of the invention is herein set forth and described, it is to be understood that various modifications and changes may be made therein including but not limited to construction and arrangement of elements as well as their composition without departing from the spirit and scope of this invention as defined by the appended claims and reasonable equivalents thereof.

REFERENCE SIGNS 1 compass
2 base member
3 vial assembly
4 vial
5 orienting marker
6 azimuth ring
7 magnetized indicator member
8 through hole
9 indentation
10 indentation
11 north end
12 south end

The invention claimed is:

1. A compass comprising
a base member;
and a vial assembly pivotally coupled to said base member, the vial assembly comprising:
a vial with at least one orienting marker;
an azimuth ring; and
a magnetized indicator member journaled in the vial, the magnetized indicator member pointing to magnetic north;
wherein the magnetized indicator member comprises a through hole; and
the orienting marker has an outer contour, wherein the shape of the outer contour of the orienting marker essentially corresponds to the shape of the inner contour of the through hole, such that outer contour of the orienting marker virtually matches the inner contour of the through hole when pointing northwards.

2. The compass of claim 1, wherein the outer contour of the orienting marker and the inner contour of the through hole are of a circular shape.

3. The compass of claim 2, wherein the circular shaped contours further comprise matching indentations.

4. The compass of claim 3, wherein the indentations point northwards.

5. The compass of claim 1, wherein the magnetized indicator member is a needle comprising a north endue.

6. The compass of claim 5, wherein the needle comprises a south end.

7. The compass of claim 6, wherein the through hole is positioned at one end of the needle.

8. The compass of claim 1, wherein an N is placed within the contour of the orienting marker.

9. The compass of claim 8, wherein the contour of the orienting marker is at least partially filled with a color silhouetted against the N.

10. The compass of claim 1, wherein the vial is transparent.

11. The compass of claim 1, wherein the vial is filed with a damping fluid.

* * * * *